United States Patent
Shimamura et al.

(10) Patent No.: US 10,516,839 B2
(45) Date of Patent: Dec. 24, 2019

(54) IMAGE SENSOR, IMAGING METHOD, AND ELECTRONIC APPARATUS

(71) Applicant: SONY CORPORATION, Tokyo (JP)

(72) Inventors: Nobutaka Shimamura, Kanagawa (JP); Atsushi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/288,927

(22) Filed: Feb. 28, 2019

(65) Prior Publication Data

US 2019/0199949 A1 Jun. 27, 2019

Related U.S. Application Data

(63) Continuation of application No. 15/993,062, filed on May 30, 2018, now Pat. No. 10,270,994, which is a continuation of application No. 15/877,693, filed on Jan. 23, 2018, now Pat. No. 10,021,323, which is a continuation of application No. 15/127,179, filed as application No. PCT/JP2015/057839 on Mar. 17, 2015, now Pat. No. 9,930,275.

(30) Foreign Application Priority Data

Mar. 31, 2014 (JP) .................. 2014-071171

(51) Int. Cl.
| | |
|---|---|
| H04N 5/335 | (2011.01) |
| H04N 3/14 | (2006.01) |
| H04N 5/365 | (2011.01) |
| H04N 5/378 | (2011.01) |
| H04N 5/374 | (2011.01) |

(52) U.S. Cl.
CPC .......... *H04N 5/3658* (2013.01); *H04N 5/378* (2013.01); *H04N 5/374* (2013.01)

(58) Field of Classification Search
CPC .... H04N 5/374; H04N 5/37457; H04N 5/378; H04N 5/376; H04N 5/359; H04N 5/341; H04N 5/369; H04N 5/37452; H04N 5/3741; H04N 5/3742; H01L 27/14609; H01L 27/14643
See application file for complete search history.

(56) References Cited

U.S. PATENT DOCUMENTS

| | | | | |
|---|---|---|---|---|
| 9,930,275 B2 * | 3/2018 | Shimamura | .......... | H04N 5/3658 |
| 10,021,323 B2 * | 7/2018 | Shimamura | .......... | H04N 5/3658 |
| 10,270,994 B2 * | 4/2019 | Shimamura | .......... | H04N 5/3658 |

(Continued)

*Primary Examiner* — Kelly L Jerabek
(74) *Attorney, Agent, or Firm* — Sheridan Ross P.C.

(57) ABSTRACT

The present technology relates to an image sensor, an imaging method, and an electronic apparatus that are capable of improving the image quality. It includes a plurality of signal lines for reading signals from pixels including a photoelectric conversion element, each of the plurality of signal lines being provided for one column of pixels, and a fixing unit configured to fix the potential of the plurality of signal lines to a predetermined potential, is started. The fixing unit fixes the potential of the plurality of signal lines before an operation of resetting the pixel. It is possible to fix the potential of the signal line to a predetermined potential before reading of the signal from the pixel, and to prevent the image quality from degrading due to the discrepancy in the potential when reading is started.

11 Claims, 10 Drawing Sheets

(56) References Cited

U.S. PATENT DOCUMENTS

| | | | |
|---|---|---|---|
| 2008/0112016 A1* | 5/2008 | Kume | H04N 5/217 358/408 |
| 2010/0079611 A1* | 4/2010 | Suzuki | H04N 5/374 348/222.1 |
| 2011/0205416 A1* | 8/2011 | Nishihara | H01L 27/14609 348/300 |
| 2011/0279724 A1* | 11/2011 | Kajihara | H04N 5/3745 348/308 |
| 2014/0063304 A1* | 3/2014 | Manabe | H04N 5/3745 348/296 |
| 2016/0044265 A1* | 2/2016 | Kato | H04N 5/361 348/308 |
| 2016/0344969 A1* | 11/2016 | Furukawa | H03M 1/56 |

* cited by examiner

IMAGE SENSOR, IMAGING METHOD, AND ELECTRONIC APPARATUS

CROSS REFERENCE TO RELATED APPLICATIONS

This application is a continuation of U.S. patent application Ser. No. 15/993,062, filed May 30, 2018, which is a continuation of U.S. patent application Ser. No. 15/877,693, filed Jan. 23, 2018, now U.S. Pat. No. 10,021,323, which is a continuation of U.S. patent application Ser. No. 15/127,179, filed Sep. 19, 2016, now U.S. Pat. No. 9,930,275, which is a national stage application under 35 U.S.C. 371 and claims the benefit of PCT Application No. PCT/JP2015/057839 having an international filing date of Mar. 17, 2015, which designated the United States, which PCT application claimed the benefit of Japanese Patent Application No. 2014-071171 filed Mar. 31, 2014, the disclosures of which are incorporated herein by reference in their entirety.

TECHNICAL FIELD

The present technology relates to an image sensor, an imaging method, and an electronic apparatus. Specifically, the present technology relates to an image sensor, an imaging method, and an electronic apparatus that contribute to the improvement of the image quality.

BACKGROUND ART

In a rear-surface irradiation type image sensor that is becoming mainstream in recent years, it is possible to increase the number of vertical signal lines per pixel column. Along with this, also architecture such as high-speed signal readout from a pixel unit and signal addition using the vertical signal line is in development.

On the other hand, in a circuit including a plurality of vertical signal lines per pixel column, the image quality may be degraded due to the difference between voltage states of the vertical signal lines or individual discrepancies thereof. In Patent Document 1, it is proposed that in a circuit including one vertical signal line per pixel column, the degradation of the image quality is suppressed by fixing the potential to midpoint potential in order to suppress sub-wobble noise.

Patent Document 1: Japanese Patent Application Laid-open No. 2005-311932

SUMMARY

Problem to be Solved

In a pixel readout circuit including a plurality of vertical signal lines per row of which some vertical signal lines are not read at an arbitrary time, discrepancy in potential between the plurality of vertical signal lines just before read resetting may generate discrepancy in the coupling amount from the vertical signal line at the time of reading a reset signal to a floating diffusion or discrepancy in settling time of a read signal, and thus, a pedestal may be generated in the amount of signals to be read In the case where the technique in which the potential is fixed to midpoint potential in order to suppress sub-wobble noise in a circuit including one vertical signal line per pixel column as in the case of Patent Document 1 is applied to a pixel readout circuit including a plurality of vertical signal lines for each row, it may be impossible to reduce the possibility where a pedestal may be generated in the amount of signals to be read because discrepancy in intermediate voltage values of the vertical signal lines is generated due to different impedances of the plurality of vertical signal lines.

The present technology has been made in view of the above circumstances not to generate a pedestal in the amount of signals to be read.

Means for Solving the Problem

The image sensor according to an aspect of the present technology includes a plurality of signal lines for reading signals from pixels including a photoelectric conversion element, each of the plurality of signal lines being provided for one column of pixels, and a fixing unit configured to fix potential of the plurality of signal lines to a predetermined potential, in which the fixing unit fixes the potential of the plurality of signal lines before reading of signals through a predetermined signal line out of the plurality of signal lines is started.

The fixing unit may fix the potential of the plurality of signal lines before an operation of resetting the pixel.

The fixing unit may include a potential fixing element and a switch, in which the switch may be provided for each of the plurality of signal lines, and the potential fixing element and the plurality of signal lines may be coupled to each other in the case where the switch is active, thereby fixing the potential of the plurality of signal lines to a predetermined potential.

The fixing unit may include a potential fixing element and a switch, the switch may be provided for each of the plurality of signal lines, and the switch may have been active between end of reading of a first pixel and start of reading of a second pixel.

The fixing unit may include a potential fixing element, in which the potential fixing element may be coupled to each of the plurality of signal lines, and the potential fixing element may be in on-state between end of reading of a first pixel and start of reading of a second pixel.

The imaging method according to an aspect of the present technology is an imaging method for an image sensor that includes a plurality of signal lines for reading signals from pixels including a photoelectric conversion element, each of the plurality of signal lines being provided for one column of pixels, and a fixing unit configured to fix potential of the plurality of signal lines to a predetermined potential, including fixing, by the fixing unit, the potential of the plurality of signal lines before reading of signals through a predetermined signal line out of the plurality of signal lines is started.

The electronic apparatus according to an aspect of the present technology includes an image sensor including a plurality of signal lines for reading signals from pixels including a photoelectric conversion element, each of the plurality of signal lines being provided for one column of pixels, and a fixing unit configured to fix potential of the plurality of signal lines to a predetermined potential, in which the fixing unit fixes the potential of the plurality of signal lines before reading of signals through a predetermined signal line out of the plurality of signal lines is started, and a signal processing unit configured to perform signal processing on a signal output from the image sensor.

In the image sensor and the imaging method according to an aspect of the present technology, a plurality of signal lines for reading signals from pixels including a photoelectric conversion element, and a fixing unit configured to fix potential of the plurality of signal lines to a predetermined potential are provided, each of the plurality of signal lines being provided for one column of pixels. The fixing unit fixes the potential of the plurality of signal lines before reading of signals through a predetermined signal line out of the plurality of signal lines is started.

Effects

According to an aspect of the present technology, it is possible to reduce the possibility of occurrence of pedestal in amount of signals to be read Furthermore, the effects described here are not necessarily limited, and may include any of the effects described in the present disclosure.

DESCRIPTION OF EMBODIMENTS

Hereinafter, an embodiment for performing the present technology (hereinafter, referred to as embodiment) will be described. Furthermore, description will be made in the following order.
1. Regarding Configuration of Imaging Apparatus
2. Regarding Configuration of Image Sensor
3. Regarding Configuration of Image Sensor Including Potential Fixing Element
4. Application Example
    <Configuration of Imaging Apparatus>

Figure 1:
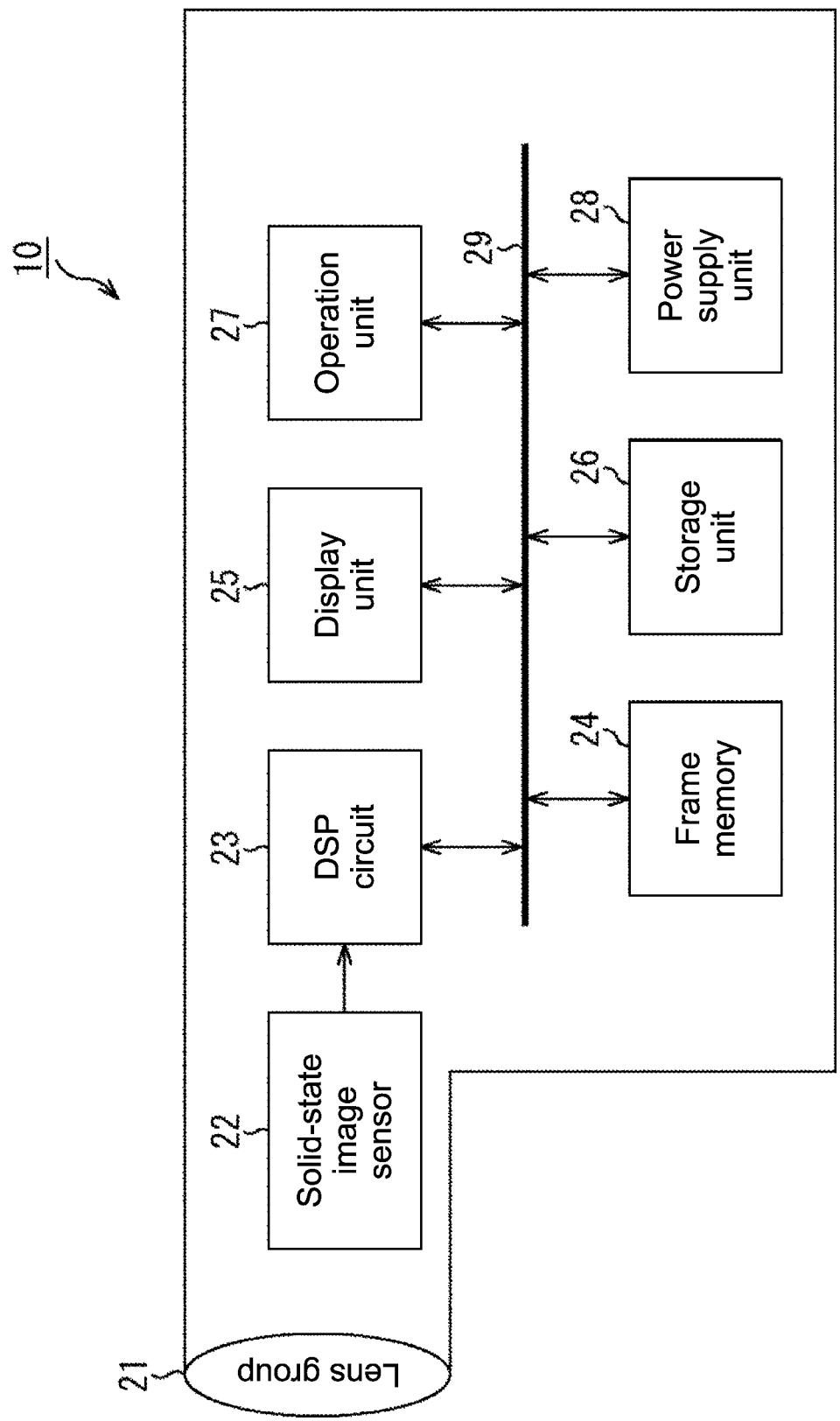
FIG. 1 A diagram showing the configuration of an imaging apparatus.

The present technology described below can be applied to a general electronic apparatus using an image sensor as an image capturing unit (photoelectric conversion part), such as an imaging apparatus such as a digital still camera and a video camera, a portable terminal apparatus having an imaging function such as a cellular phone, and a copier using an imaging device as an image reading unit FIG. 1 is a block diagram showing an example of configuration of an electronic apparatus according to the present technology, e.g., imaging apparatus. As shown in FIG. 1, the imaging apparatus 10 according to the present technology includes an optical system that includes a lens group 21 and the like, a solid-state image sensor (imaging device) 22, a DSP (Digital Signal Processor) circuit 23, a frame memory 24, a display unit 25, a storage unit 26, an operation unit 27, a power supply unit 28, and the like. The DSP circuit 23, the frame memory 24, the display unit 25, the storage unit 26, the operation unit 27, and the power supply unit 28 are coupled to each other via a bus line 29.

The lens group 21 captures incident light (image light) from an object to form an image on the imaging surface of the solid-state image sensor 22. The solid-state image sensor 22 converts the light amount of incident light imaged on the imaging surface by the lens group 21 into an electric signal on a pixel-by-pixel basis to output it as a pixel signal.

The DSP circuit 23 processes a signal obtained from the solid-state image sensor 22. For example, although the details will be described later, the solid-state image sensor 22 includes a pixel for detecting focus, and the DSP circuit 23 processes a signal obtained from such a pixel and performs processing to detect focus. Moreover, the solid-state image sensor 22 includes a pixel for establishing an image of an object, and the DSP circuit 23 processes a signal obtained from such a pixel and performs processing to expand it to the frame memory 24.

The display unit 25 includes a panel-type display device such as a liquid crystal display device and an organic EL (electro luminescence) display device, and displays a moving image or still image captured by the solid-state image sensor 22. The storage unit 26 stores a moving image or still image captured by the solid-state image sensor 22 in a storage medium such as a video tape and a DVD (Digital Versatile Disk).

The operation unit 27 issues a command regarding various functions of the imaging apparatus by an operation performed by the user. The power supply unit 28 appropriately supplies various kinds of power sources as operation power sources for the DSP circuit 23, the frame memory 24, the display unit 25, the storage unit 26, and the operation unit 27 to these supply targets.

The imaging apparatus having the above-mentioned configuration can be used as an imaging apparatus such as a video camera, a digital still camera, and a camera module for a mobile apparatus such as a mobile phone.

<Regarding Configuration of Image Sensor>

Figure 2:
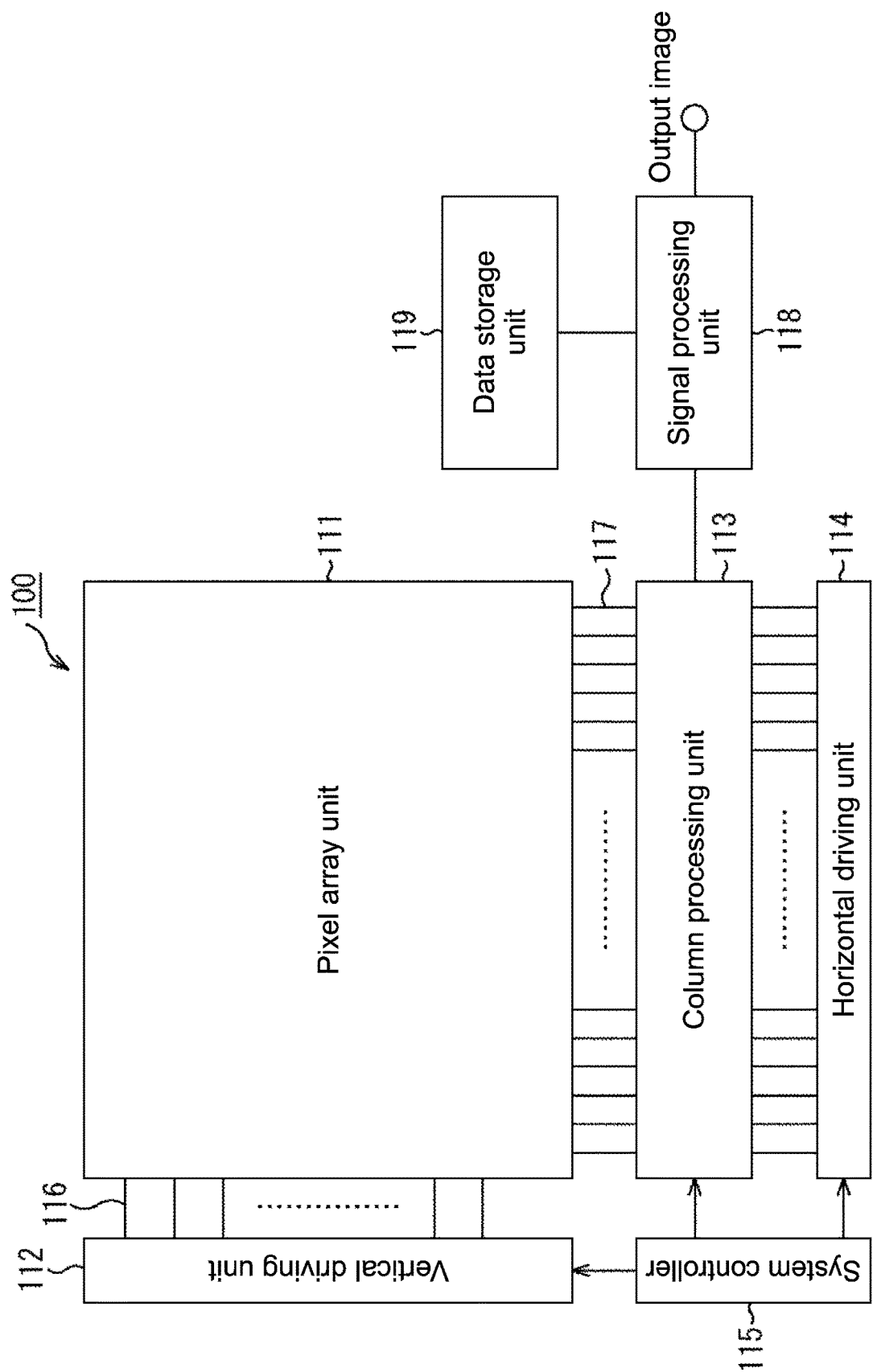
FIG. 2 A diagram showing the configuration of a solid-state image sensor.

FIG. 2 is a diagram showing the configuration of the solid-state image sensor 22, and is a system configuration diagram schematically showing the configuration of a CMOS image sensor as a type of an XY address type imaging apparatus, for example. Furthermore, the CMOS image sensor is an image sensor created by applying or partially using CMOS processing.

A CMOS image sensor 100 shown in FIG. 2 has a configuration including a pixel array unit 111 formed on a semiconductor substrate (not shown) and a peripheral circuit integrated on the same semiconductor substrate as the one on which the pixel array unit 111 is mounted. The peripheral circuit includes a vertical driving unit 112, a column processing unit 113, a horizontal driving unit 114, and a system controller 115, for example.

The CMOS image sensor 100 further includes a signal processing unit 118 and a data storage unit 119. The signal processing unit 118 and the data storage unit 119 may be mounted on the same substrate as the one on which the CMOS image sensor 100 is mounted, or arranged on another substrate different from the substrate on which the CMOS image sensor 100 is mounted. Moreover, processing performed by the signal processing unit 118 and the data storage unit 119 may be one performed by an external signal processing unit provided on another substrate different from the substrate on which the CMOS image sensor 100 is mounted, e.g., a DSP (Digital Signal Processor) circuit or software.

The pixel array unit 111 has a configuration in which unit pixels (hereinafter, referred to simply as "pixel" in some cases) including a photoelectric conversion unit that generates and stores a photocharge depending on the amount of received light are two-dimensionally arranged in a row direction and a column direction, i.e., in a matrix pattern. Furthermore, the row direction represents the arrangement direction of pixels in a pixel row (i.e., horizontal direction) and the column direction represents the arrangement direction of pixels in a pixel column (i.e., vertical direction).

In the pixel array unit 111, with respect to pixels arranged in matrix pattern, a pixel drive line 116 is arranged along a row direction for each pixel row, and a vertical signal line 117 is arranged in a column direction for each pixel column. The pixel drive line 116 transmits a drive signal for driving when reading signals from pixels. In FIG. 1, the pixel drive line 116 includes one line, but it is not limited thereto. On end of the pixel drive line 116 is coupled to an output end of the vertical driving unit 112, which corresponds to each row.

The vertical driving unit 112 includes a shift register, an address decoder, and the like, and simultaneously drives all pixels of the pixel array unit 111 or drives pixels row by row, for example. Specifically, the vertical driving unit 112 and the system controller 115 that controls the vertical driving unit 112 constitute a driving unit that drives the pixels of the pixel array unit 111. Although illustration of the specific configuration of the vertical driving unit 112 is omitted, the vertical driving unit 112 generally has a configuration including two scanning system of a read scanning system and a sweep scanning system.

The read scanning system sequentially and selectively scans the unit pixels of the pixel array unit 111 row by row to read a signal from the unit pixel. The signal read from the unit pixel is an analog signal. The sweep scanning system performs sweep scanning on the read row on which the read scanning is performed by the read scanning system, ahead of the read scanning for the time of the shutter speed.

An unnecessary charge is swept from the photoelectric conversion unit of the unit pixel in the read row by the sweep scanning performed by the sweep scanning system, thereby resetting photoelectric conversion unit. Due to the sweeping (resetting) of the unnecessary charge by this sweep scanning system, a so-called electronic shutter operation is performed. Furthermore, the electronic shutter operation represents an operation to discard a photocharge of the photoelectric conversion unit and newly start exposure (starts storing photocharges).

The signal read through the read operation performed by the read scanning system corresponds to the amount of light received after the previous read operation or electronic shutter operation. The period from the timing of reading in the previous read operation or the timing of sweeping in the electronic shutter operation to the timing of reading in the current read operation is the exposure period of the photocharges in the unit pixel.

The signal output from the unit pixels in the pixel row selectively scanned by the vertical driving unit 112 is input to the column processing unit 13 through the respective vertical signal lines 117 in the pixel columns. The column processing unit 113 performs predetermined signal processing on the signal output from the pixels in the selected row through the vertical signal line 117 for each pixel column of the pixel array unit 111, and temporarily stores the processed pixel signal.

Specifically, the column processing unit 113 performs, as signal processing, at least noise removal processing, e.g., CDS (Correlated Double Sampling) processing. The CDS processing performed by the column processing unit 113 removes fixed pattern noise peculiar to the pixel such as reset noise and discrepancy in the threshold value of an amplification transistor in the pixel. By causing the column processing unit 113 to have a function of AD (analog-digital) conversion, for example, in addition to the noise removal processing, it is possible to convert the analog pixel signal into a digital signal to output the converted signal.

The horizontal driving unit 114 includes a shift register, an address decoder, and the like, and sequentially selects a unit circuit corresponding to the pixel column of the column processing unit 113. By the selective scanning performed by the horizontal driving unit 114, a pixel signal processed by the column processing unit 113 for each unit circuit is sequentially output.

The system controller 115 includes, for example, a timing generator that generates various timing signals, and performs drive control on the vertical driving unit 112, the column processing unit 113, the horizontal driving unit 114, and the like based on various timing generated by the timing generator.

The signal processing unit 118 has at least an arithmetic processing function, and performs various signal processing such as arithmetic processing on the pixel signal output from the column processing unit 113. The data storage unit 119 temporarily stores data necessary in the signal processing performed by the signal processing unit 118.

<Configuration Example of Pixel Circuit>

Figure 3:
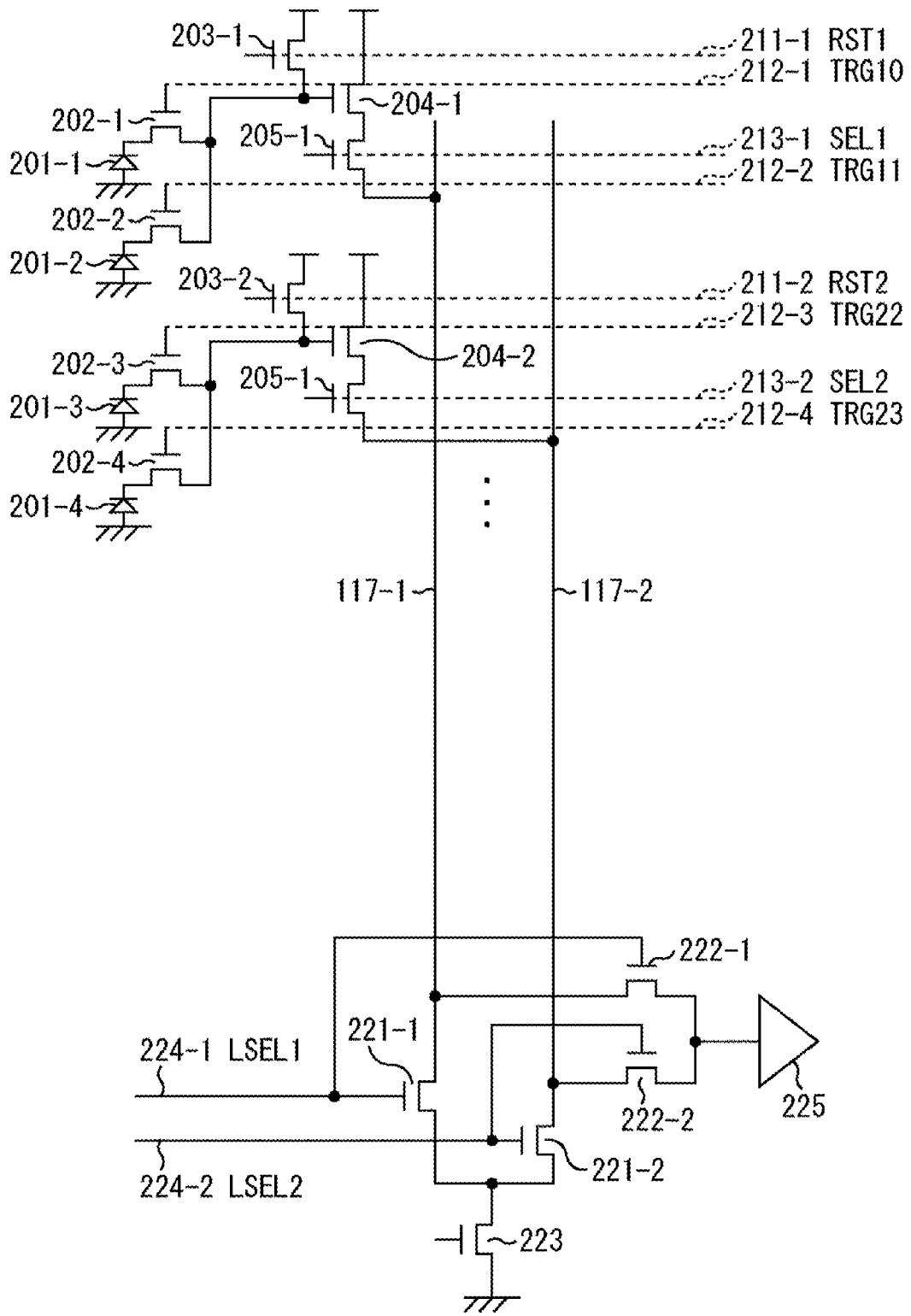
FIG. 3 A circuit diagram of the image sensor.

FIG. 3 is a diagram showing a configuration example of the pixel circuit included in the image sensor. In FIG. 3, an example of four pixels in which 2 pixels are coupled to one vertical signal line, i.e., two pixels are shared will be described.

In FIG. 3, one pixel has a configuration including, in addition to a photoelectric conversion element, e.g., photodiode (PD) 201-1, four transistors of a transfer transistor 202-1, a reset transistor 203-1, an amplification transistor 204-1, and a selection transistor 205-1.

An example in which an NchMOS transistor is used as the transfer transistor 202-1, the reset transistor 203-1, the amplification transistor 204-1, and the selection transistor 205-1 is described herein. However, a PchMOS transistor can also be used.

The photodiode 201-1 has an anode coupled to a first power supply potential, e.g., ground, photoelectrically converts incident light into a signal charge (photoelectron) having the amount of charge depending on the light amount, and stores the signal charge.

The drain, source, and gate of the transfer transistor 202-1 are coupled to a floating diffusion FD, the cathode of the photodiode 201-1, and a transfer wiring 212-1, respectively. The transfer transistor 202-1 is turned on (in conductive mode) when a transfer pulse TRF is supplied to the gate from the vertical driving unit 112 through the transfer wiring 212-1, and transfers the signal charges stored in the photodiode 201-1 to the floating diffusion FD.

The drain, source, and gate of the reset transistor 203-1 are coupled to a second power supply potential, e.g., power supply wiring (not shown) of a power supply potential VDD, the floating diffusion FD, and a reset wiring 211-1, respectively. The reset transistor 203-1 is turned on when a reset pulse RST is supplied to the gate from the vertical driving unit 112 through the reset wiring 211-1, and resets the floating diffusion FD by discarding the signal charge of the floating diffusion FD in the power supply wiring.

The drain and gate of the amplification transistor 204-1 are coupled to the power supply wiring and the floating diffusion FD, respectively. The amplification transistor 204-1 outputs a signal corresponding to the potential of the floating diffusion FD.

The drain, source, and gate of the selection transistor 205-1 are coupled to the source of the amplification transistor 204-1, a vertical signal line 117-1, and a selection wiring 213-1, respectively. The selection transistor 205-1 is turned on when a selection pulse SEL is supplied to the gate from the vertical driving unit 112 through the selection wiring 213-1, selects the pixel, and loads a signal of the pixel output from the amplification transistor 204 into the vertical signal line 117-1.

To the vertical signal line 117-1, also a pixel including a photodiode 201-2 is connected. Furthermore, a pixel including the photodiode 201-1, a pixel including the photodiode 201-2, a pixel including a photodiode 201-3, and a pixel including a photodiode 201-4 are appropriately referred to as a pixel A, a pixel B, a pixel C, and a pixel D, respectively.

To the vertical signal line 117-1, the pixel A and the pixel B are connected. The pixel A and the pixel B basically have a similar configuration. The pixel B has a configuration including the photodiode 201-2 and the transfer transistor 202-1. Moreover, the pixel A and the pixel B are configured to share the reset transistor 203-1, the amplification transistor 204-1, and the selection transistor 205-1 with each other.

To the vertical signal line 117, the pixel C and the pixel D are connected. Also the pixel C and the pixel D basically have a similar configuration to the pixel A. The pixel C has a configuration including the photodiode 201-3 and a transfer transistor 202-3. The pixel D has a configuration including the photodiode 201-4 and a transfer transistor 202-4.

Moreover, the pixel C and the pixel D are configured to share a reset transistor 203-2, an amplification transistor 204-2, and a selection transistor 205-2 with each other. The selection transistor 205-2 is coupled to a vertical signal line 117-2.

To the vertical signal line 117-1 and the vertical signal line 117-2, a constant current source 223 is connected. The constant current source 223 is a circuit for constantly passing a constant current I through the vertical signal line 117-1 and the vertical signal line 117-2.

To the vertical signal line 117-1, a transistor 221-1 and a transistor 222-1 are connected. In the case where a pixel signal is read from the vertical signal line 117-1, a selection pulse LSEL1 is supplied to these transistors through a selection wiring 224-1.

Similarly, to the vertical signal line 117-2, a transistor 221-2 and a transistor 222-2 are connected. In the case where a pixel signal is read from the vertical signal line 117-2, a selection pulse LSEL2 is supplied to these transistors through a selection wiring 224-2.

The pixel signal from the selected vertical signal line 117-1 or vertical signal line 117-2 is converted from an analog signal into a digital signal by an ADC 225.

Figure 4:
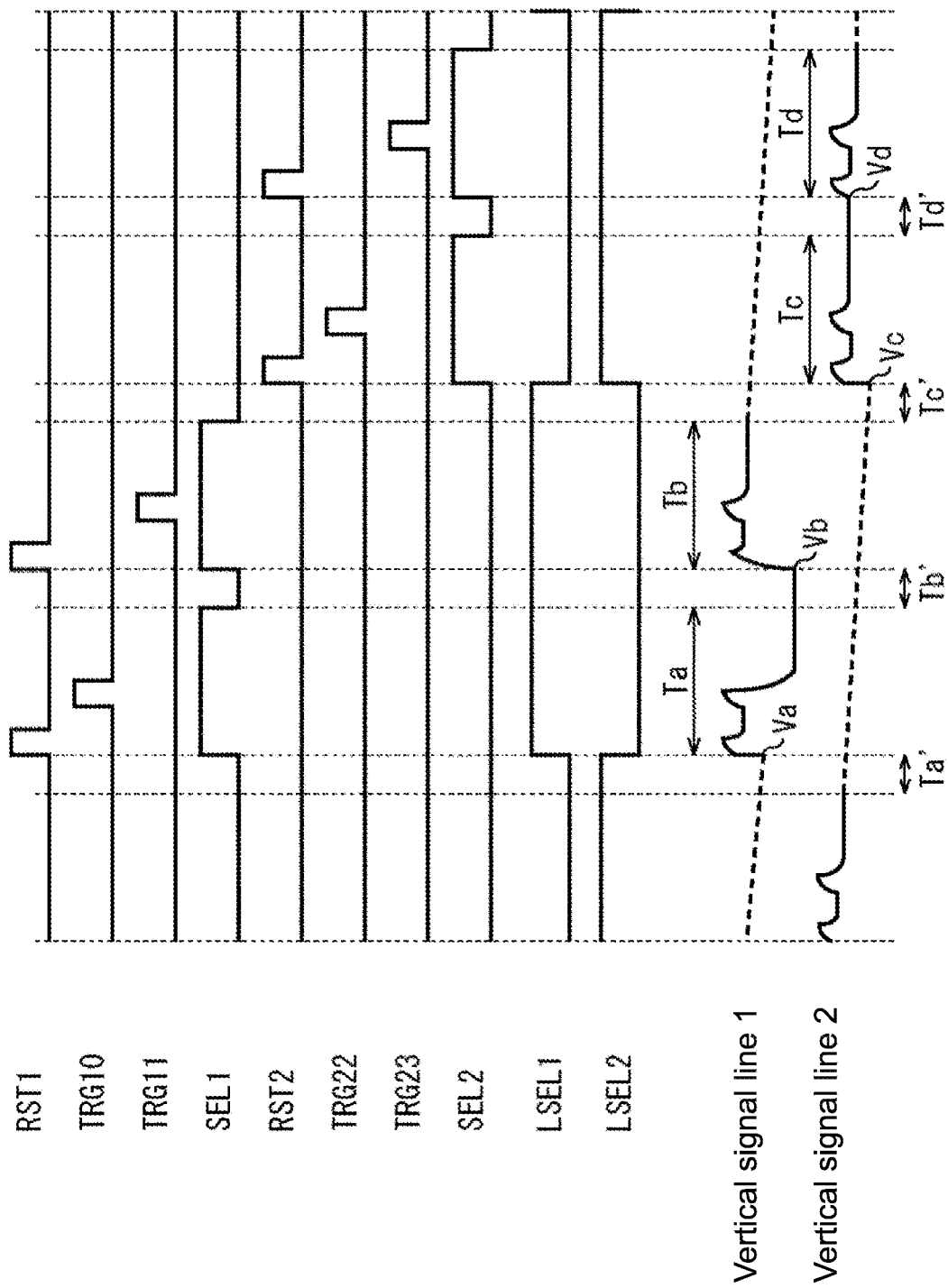
FIG. 4 A timing chart for explaining an operation of the image sensor.

FIG. 4 is a timing chart showing driving timing of the CMOS image sensor shown in FIG. 3. In sequential order from the top of FIG. 4, a reset pulse RST1 represents a signal in the reset wiring 211-1, a transfer pulse TRG10 represents a signal in the transfer wiring 212-1, a transfer pulse TRG11 represents a signal in a transfer wiring 212-2, and a selection pulse SEL1 represents a signal in the selection wiring 213-1.

Moreover, a reset pulse RST2 represents a signal in a reset wiring 211-2, a transfer pulse TRG22 represents a signal in a transfer wiring 212-3, a transfer pulse TRG23 represents a signal in a transfer wiring 212-4, and a selection pulse SEL2 represents a signal in a selection wiring 213-2.

Moreover, the selection pulse LSEL1 represents a signal in the selection wiring 224-1, and the selection pulse LSEL2 represents a signal in the selection wiring 224-2. Moreover, a vertical signal line 1 represents a signal showing the potential of the vertical signal line 117-1 and a vertical signal line 2 represents a signal showing the potential of the vertical signal line 117-2.

In FIG. 4, the vertical axis scales are different from each other for illustrative purposes. The active mode for the selection pulse SEL, the reset pulse RST, the transfer pulse TRG, and the selection pulse LSEL is the mode at "H" level.

Reading from the pixel A is performed in a time period Ta. In addition to the selection pulse LSEL1 and the selection pulse SEL1, the reset pulse RST1 is active simultaneously therewith, and thus, the floating diffusion FD of the pixel A is reset by the reset transistor 203-1. The potential of the reset floating diffusion FD is amplified by the amplification transistor 204-1 as a reset level, before the amplified potential is output to the vertical signal line 117-1 by the selection transistor 205-1.

After the outputting of the reset level, a transfer pulse TRF10 is active. Accordingly, the signal charge (photoelectron) of the photodiode 201-1 is transferred to the floating diffusion FD by the transfer transistor 202-1, and the potential of the floating diffusion FD after the transfer is amplified by the amplification transistor 204-1 as a signal level before the amplified potential is output to the vertical signal line 117-1 by the selection transistor 205-1. The reset level and the signal level are sequentially transmitted to the column processing unit 113 (FIG. 2) through the vertical signal line 117-1.

In the case where the reading from the pixel A is finished, reading from the pixel B is performed in a time period Tb as a next time period. The state of the selection pulse LSEL1 that has selected the vertical signal line 117-1 has been active from the time of reading of pixel A.

The selection pulse SEL1 is active again when the state of the selection pulse LSEL1 is active, and also the reset pulse RST1 is active simultaneously therewith. Accordingly, the floating diffusion FD of the pixel B is reset by the reset transistor 203-1, and the potential of the reset floating diffusion FD is amplified by the amplification transistor 204-1 as a reset level before the amplified potential is output to the vertical signal line 117-1 by the selection transistor 205-1.

After the outputting of the reset level, a transfer pulse TRF11 is active. Accordingly, the signal charge (photoelectron) of the photodiode 201-2 is transferred to the floating diffusion FD by a transfer transistor 202-2, and the potential of the floating diffusion FD after the transfer is amplified by the amplification transistor 204-1 as a signal level before the amplified potential is output to the vertical signal line 117-1 by the selection transistor 205-1. The reset level and the signal level are sequentially transmitted to the column processing unit 113 (FIG. 2) through the vertical signal line 117-1.

As described above, in the pixel A and the pixel B coupled to the same vertical signal line 117-1, reading is performed at displaced timing.

Thereafter, reading of a signal from the pixel C and the pixel D coupled to the vertical signal line 117-2 is performed. The reading from the pixel C is performed in a time period Tc, and the reading from the pixel D is performed in a time period Td. Because the reading from the pixel C and the pixel D is performed in a basically similar way to the reading from the pixel A and the pixel B, detailed description will be omitted.

The column processing unit 113 performs various kinds of processing such as CDS processing that removes fixed pattern noise peculiar to the pixel and holding or amplification of the signal after the CDS processing, by generating a pedestal between the reset level and the signal level, for example.

Now, FIG. 3 and FIG. 4 are referred to again. As shown in FIG. 3, in the pixel readout circuit including a plurality of vertical signal lines per column of which some vertical signal lines are not read at an arbitrary time, discrepancy in potential between the plurality of vertical signal lines just before read resetting may generate discrepancy in the coupling amount from the vertical signal line at the time of reading a reset signal to a floating diffusion or discrepancy in settling time of a read signal, and thus, a pedestal may be generated in the amount of signals to be read Assumption is made that the timing chart shown in FIG. 4 is, for example, a chart obtained by capturing an image at the same black level. The above-mentioned generation mechanism may generate a difference in the results obtained by reading the pixel A to the pixel D and AD-converting it. Under normal circumstances, the signal level read from pixel A to pixel D is the same because an image is captured at the same black level.

With reference to FIG. 4, the potential of the vertical signal line 117-1 at the time when reading from the pixel A is started is a potential Va, and the potential of the vertical signal line 117-1 at the time when reading from the pixel B is started is a potential Vb. Similarly, the potential of the vertical signal line 117-2 at the time when reading from the pixel C is started is a potential Vc, and the potential of the vertical signal line 117-2 at the time when reading from the pixel D is started is a potential Vd.

Due to the above-mentioned reason, the potential Va, the potential Vb, the potential Vc, and the potential Vd may each have a different value. As described above, discrepancy in potential at the time when reading is started may eventually generate discrepancy in values obtained after AD-conversion. Therefore, discrepancy in signal level read from the pixel is generated even if an image is captured at the same black level as described above, which results in image unevenness.

It may be improved by, for example, by ensuring sufficient settling time for the discrepancy in potential of the plurality of vertical signal lines to converge. However, as the settling time is increased, the time to perform reading also increases accordingly, and therefore, it is difficult to perform high-speed read operation.

<Regarding Configuration of Image Sensor Including Potential Fixing Element>

In view of the above, the image sensor in which the discrepancy in pixel signal is not generated while achieving a high-speed read operation will be described.

Figure 5:
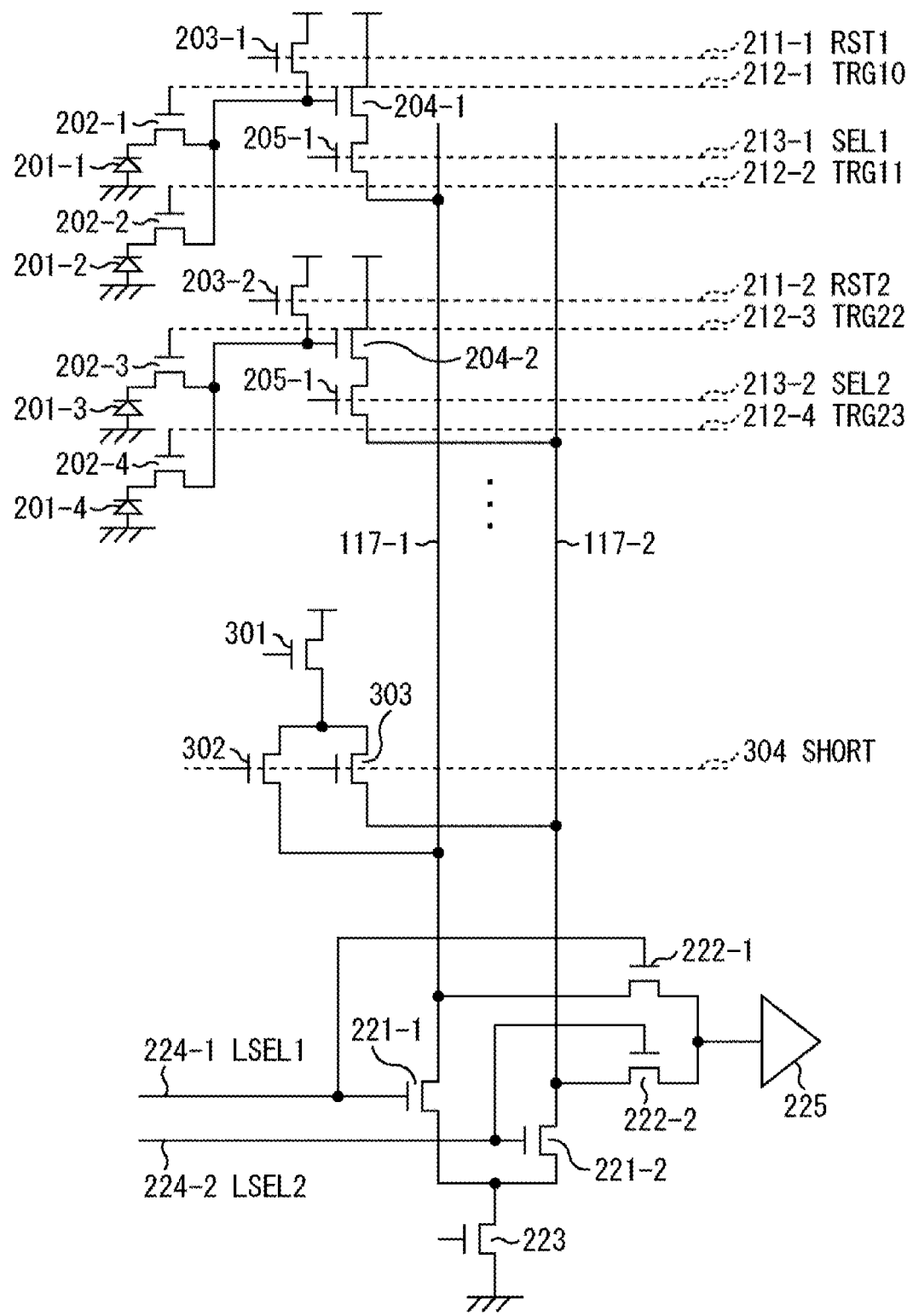
FIG. 5 Another circuit diagram of the image sensor.

FIG. 5 is a diagram showing the configuration of an embodiment of the image sensor to which the present technology is applied. In the configuration of the image sensor shown in FIG. 5, the same configuration as that of the image sensor shown in FIG. 3 will be denoted by the same reference symbols, and a detailed description thereof will be omitted.

The image sensor shown in FIG. 5 has a configuration including a plurality of vertical signal lines, i.e., the vertical signal line 117-1 and the vertical signal line 117-2 in this case, for pixels arranged in one column, i.e., the pixel A to the pixel D in this case, similarly to the image sensor shown in FIG. 3.

The image sensor shown in FIG. 5 is compared to the image sensor shown in FIG. 3. The image sensor shown in FIG. 5 has a configuration obtained by adding a potential fixing element 301 and a connection switch 302 to the image sensor shown in FIG. 3, and other configurations thereof may be the same as the configuration of the image sensor shown in FIG. 1.

The potential fixing element 301 is an element that applies voltage to fix the potential of the vertical signal line 117-1 and the vertical signal line 117-2 to a predetermined value. The voltage of the potential fixing element 301 is applied to the vertical signal line 117-1 and the vertical signal line 117-2 in the case where the switch 302 and a switch 303 are closed.

The switch 302 and the switch 303 shown in FIG. 5 are NMOS switches, but may be CMOS switches.

Because an example of the case where two vertical signal lines of the vertical signal line 117-1 and the vertical signal line 117-2 are provided for the pixel A to the pixel D arranged in one column is described, an example of the case where two switches of the switch 302 and the switch 303 are provided will be described herein. However, in the case where N vertical signal lines are provide, N switches are provided in accordance with the vertical signal lines.

The switch 302 and the switch 303 open and close in response to a switch pulse SHORT supplied through a switch wiring 304. The switch 302 is coupled to the vertical signal line 117-1, and the switch 303 is coupled to the vertical signal line 117-2.

Therefore, in the case where the switch 302 is closed, the voltage from the potential fixing element 301 is applied to the vertical signal line 117-1. Similarly, in the case where the switch 303 is closed, the voltage from the potential fixing element 301 is applied to the vertical signal line 117-2. As will be described below, the switch 302 and the switch 303 are closed at the same timing and are opened at the same timing.

The switch pulse SHORT supplied through the switch wiring 304 is a pulse to drive the switch 302 and the switch 303, and the state thereof is active for a predetermined time period before read resetting for each row is started.

The time period during which the state of the switch is active may be the settling time period of the vertical signal line necessary until the above-mentioned black level pedestal becomes negligible. Moreover, the timing at which the state of the switch pulse SHORT becomes non-active may be extended to the range that does not affect the settling of read resetting.

In the circuit related to the image sensor having such a configuration, the switch 302 and the switch 303 are closed during the switch pulse SHORT is active, and thus, the vertical signal line 117-1 and the vertical signal line 117-2 short out and have the same potential.

By the potential fixing element 301 ahead of the switch 302 and the switch 303, the absolute voltage value during active mode is also determined. The potential fixing element 301 may include an arbitrary voltage generation source circuit.

Alternatively, in the case where the vertical signal lines 117-1 and 117-2 include a circuit having the same effect as that of a circuit including the potential fixing element 301 and the switch 302 and 303, e.g., a circuit that clamps the vertical signal line, it may be possible to remove the potential fixing element 301.

Figure 6:
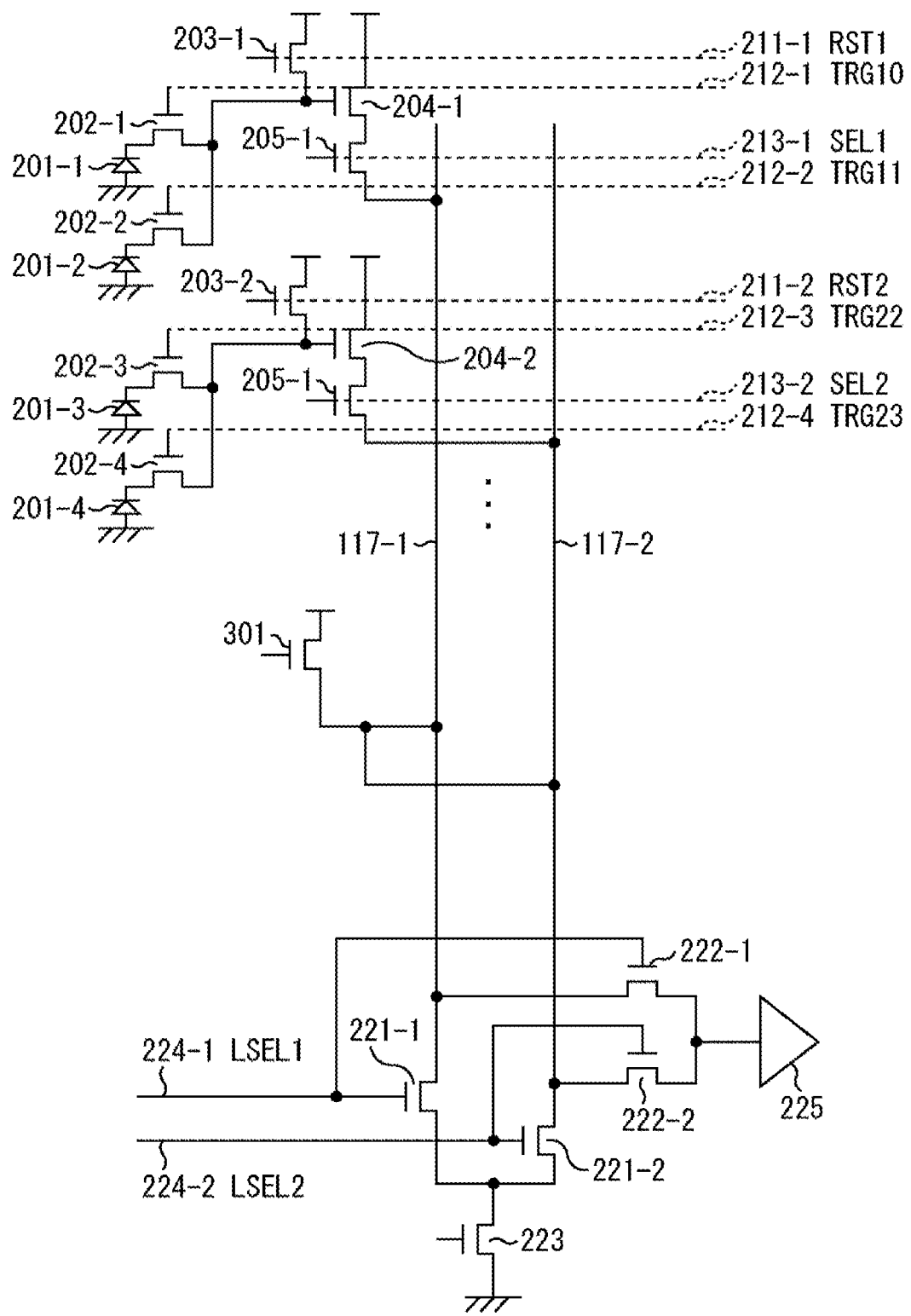
FIG. 6 Another circuit diagram of the image sensor.

FIG. 6 shows another circuit configuration of the image sensor. As shown in FIG. 6, it is possible to provide no switch. The circuit configuration of the image sensor shown in FIG. 6 is obtained by removing the switch 302 and the switch 303 from the circuit configuration of the image sensor shown in FIG. 5, and directly connecting the potential fixing element 301 to the vertical signal line 117-1 and the vertical signal line 117-2.

In the case where the potential fixing element 301 is an element capable of supplying voltage with sharp rise, in other words, it is an element capable of changing the potential of the plurality of vertical signal lines to a predetermined potential within a predetermined time, it may have a circuit configuration that can obtain the same effects as that in the case where a switch is provided, by controlling on and off of the potential fixing element 301.

Herein, description will further proceed with an example of the case shown in FIG. 5 in which a switch is provided.

Figure 7:
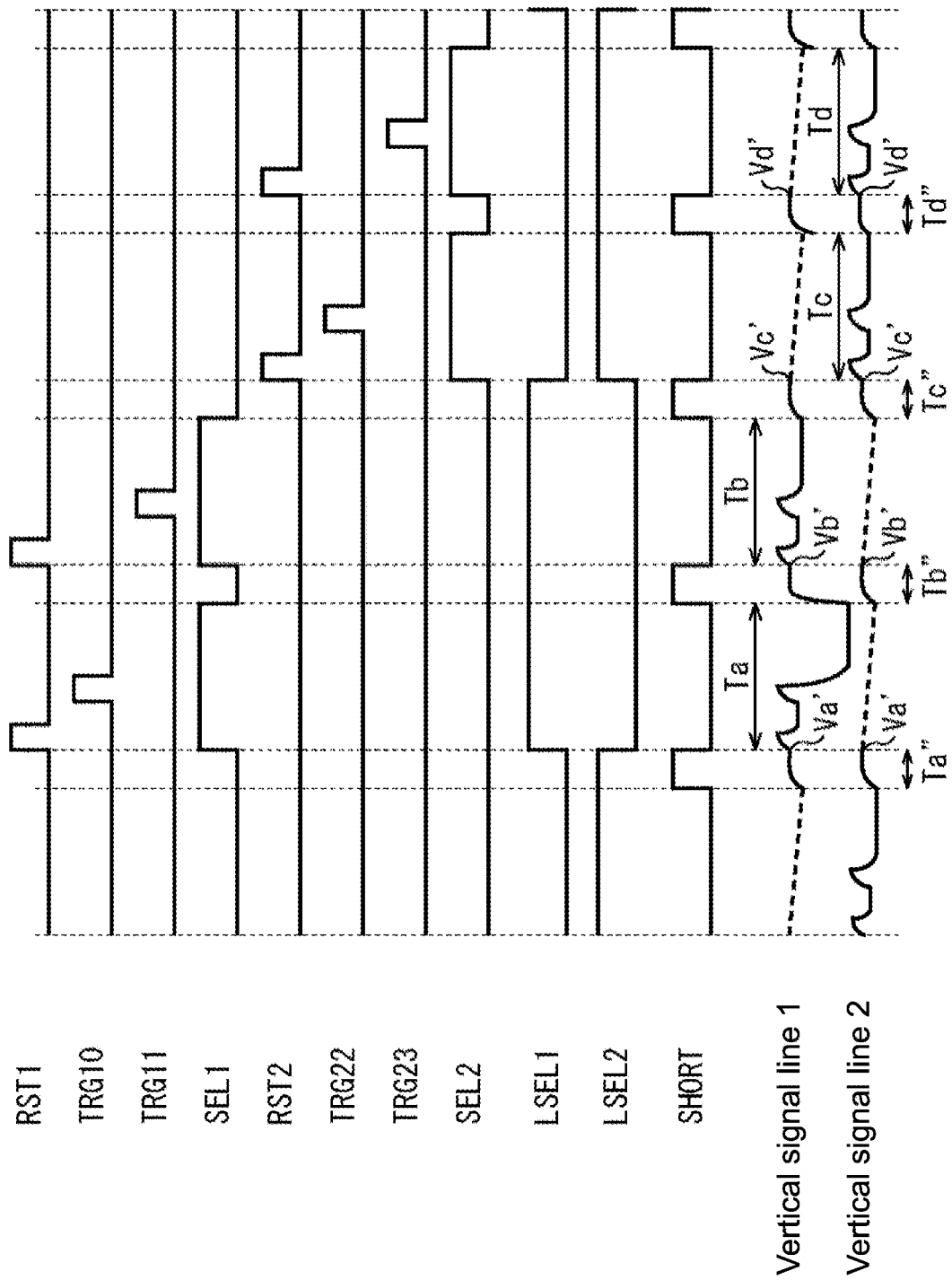
FIG. 7 A timing chart for explaining an operation of the image sensor.

FIG. 7 is a timing chart showing driving timing of the CMOS image sensor shown in FIG. 6. In the timing chart shown in FIG. 7, the reset pulse RST1, the transfer pulse TRG10, the transfer pulse TRG11, the selection pulse SEL1, the reset pulse RST2, the transfer pulse TRG22, the transfer pulse TRG23, the selection pulse SEL2, the selection pulse LSEL1, and the selection pulse LSEL2 are the same as those of the timing chart shown in FIG. 4.

Specifically, also in the image sensor shown in FIG. 5, the read operation from the pixel A to the pixel D is performed in a similar way as that in the image sensor shown in FIG. 3. However, the image sensor shown in FIG. 5 is different from the image sensor shown in FIG. 3 in that all vertical signal lines are caused to have the same potential before the read operation is started (before the read resetting is started). This will be described.

Reading from the pixel A (photodiode 201-1) is performed in the time period Ta. However, in the time period Ta before the reading is performed, in the case where the switch pulse SHORT is applied to the switch 302 and the switch 303 through the switch wiring 304, it turns active, and the potential of the vertical signal line 117-1 and the vertical signal line 117-2 is set to the potential specified by the potential fixing element 301.

In the example shown in FIG. 7, the potential of the vertical signal line 117-1 is a potential Va'. Moreover, also the potential of the vertical signal line 117-2 is the potential Va'. As described above, at the time when reading from the pixel A is started, the potential of the vertical signal line 117-1 is the potential Va'. The potential Va' is the same as the potential of the potential fixing element 301.

When reading from the pixel A is finished, the reading from the pixel B is started. However, in a time period Tb" before the time when the reading from the pixel B is started, the potential of the vertical signal line 117-1 is set by performing similar processing as performed in the time period Ta".

In the time period Tb" between the time period Ta in which the reading from the pixel A is performed and the time period Tb in which the reading from the pixel B is performed, the switch pulse SHORT is applied to the switch 302 and the switch 303 through the switch wiring 304, and it turns active. As a result, the potential of the vertical signal line 117-1 and the vertical signal line 117-2 is set to the potential specified by the potential fixing element 301.

In the example shown in FIG. 7, the potential of the vertical signal line 117-1 is a potential Vb' and also the potential of the vertical signal line 117-2 is the potential Vb'. As described above, at the time when the reading from the pixel B is started, the potential of the vertical signal line 117-1 is the potential Vb'. The potential Vb' is the same as the potential of the potential fixing element 301. Therefore, the potential Va' and the potential Vb' are the same potential.

Similarly, reading from the pixel C and the pixel D is performed. In a time period Tc" before the reading from the pixel C is started, the potential of the vertical signal line 117-1 and the vertical signal line 117-2 is set to a potential Vc' similarly to the case of the time period Ta" or the time period Tb". Similarly, in a time period Td", the potential of the vertical signal line 117-1 and the vertical signal line 117-2 is set to a potential Vd'.

The potential Vc' and the potential Vd' are the same potential as the potential of the potential fixing element 301. Therefore, the potential Vc' and the potential Vd' are the same potential.

In this case, the potential Va' of the vertical signal line 117-1 at the time when the reading from the pixel A is started, the potential Vb' of the vertical signal line 117-1 at the time when the reading from the pixel B is started, the potential Vc' of the vertical signal line 117-2 at the time when the reading from the pixel C is started, and the potential Vd' of the vertical signal line 117-2 at the time when the reading from the pixel A is started are the same potential.

As described above, in the circuit of the image sensor shown in FIG. 5, initialization processing that causes the potential of the vertical signal line to have a predetermined value is performed before reading from a predetermined pixel is started. Therefore, the potential of the vertical signal line has a predetermined value before reading from a predetermined pixel is started.

Accordingly, it is possible to start reading from all the pixels in the state where the potential of the vertical signal line at the time when the reading is started (when read resetting is started) is the same potential. Specifically, it is possible to prevent the situation where the potential at the time when reading is started is different for the pixels from arising, at the time when the reading is started.

As described above, according to the present technology, it is possible to fix the initial voltage value of the plurality of vertical signal lines at the time when reading is started to a constant value in a short time period, and to reduce the coupling amount to the floating diffusion FD generated in an arbitrary vertical signal line at the time of reading and the discrepancy in the settling time necessary for the reading.

Accordingly, it is possible to eliminate degradation of the image quality due to the state of the potential of the vertical signal line before a read operation.

Moreover, according to the present technology, it is possible to reduce the difference between the voltage of the plurality of vertical signal lines before the read resetting with high accuracy (to not more than 10 mV).

Furthermore, in the above-mentioned embodiment, an example in which the switch 302 and the like are provided for the vertical signal line 117 has been described. However, the present technology can be applied to another line other than the vertical signal line. For example, the present technology can be applied to the case where the potential of a signal line that reads some kind of signal is desired to be constantly the same potential at the time when the reading is started.

Application Example

Hereinafter, an application example of the above-mentioned focus detection apparatus including the phase difference detection pixel will be described. The solid-state image sensor 22 in the above-mentioned embodiment can be applied to an electronic apparatus in various fields, in addition to the imaging apparatus (camera) shown in FIG. 1.

Now, as an example thereof, an endoscope camera and a vision chip (artificial retina) will be described.

Figure 8:
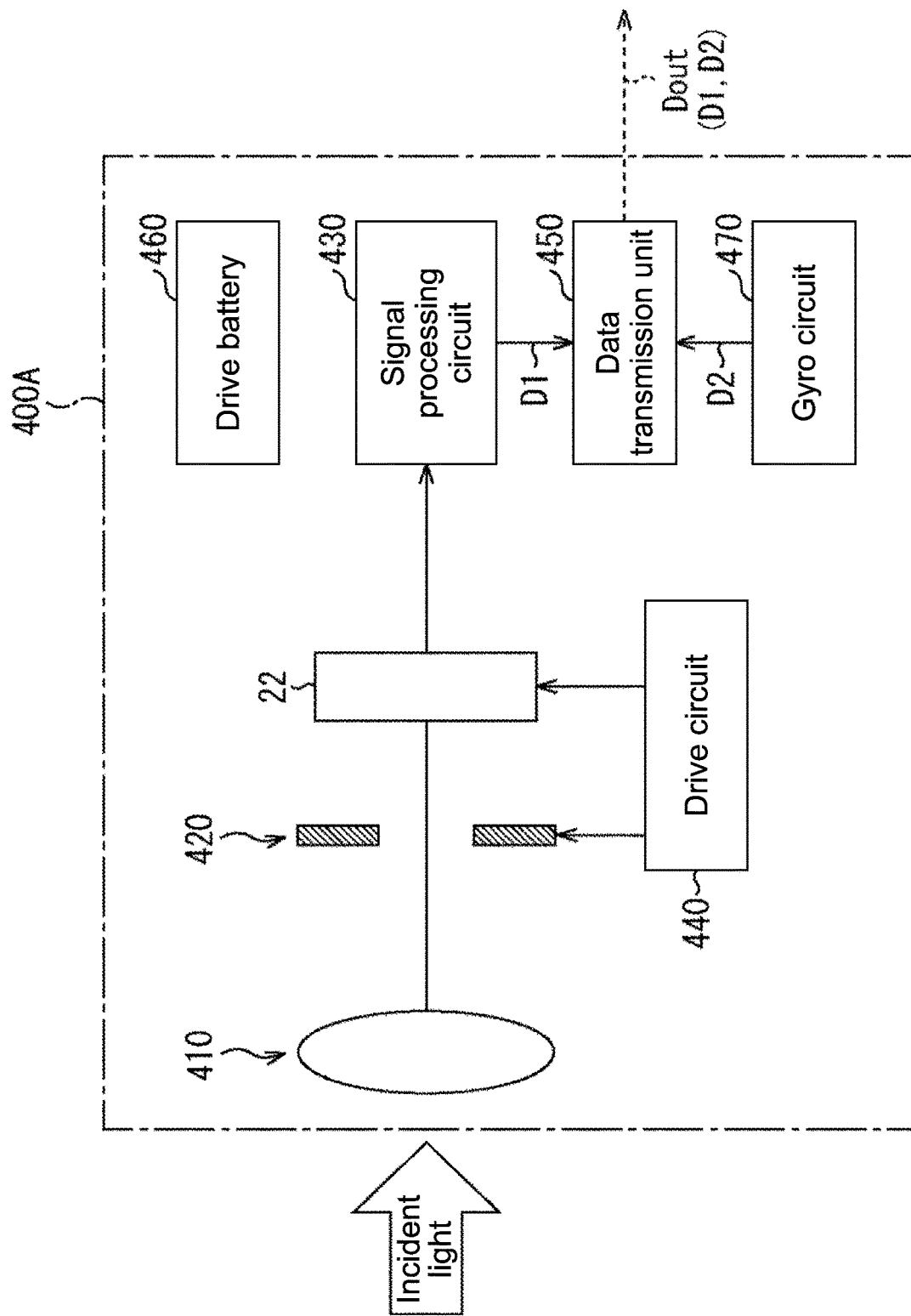
FIG. 8 A diagram showing application example to an endoscope.

FIG. 8 is a functional block diagram showing an overall configuration of an endoscope camera (capsule-type endoscope camera 400A) according to an application example. The capsule-type endoscope camera 400A includes an optical system 410, a shutter device 420, the solid-state image sensor 22, a drive circuit 440, a signal processing circuit 430, a data transmission unit 450, a drive battery 460, and a gyro circuit 470 for sensing a position (direction, angle).

The optical system 410 includes at least one imaging lens that forms an image of image light (incident light) from an object on the imaging surface of the solid-state image sensor 22. The shutter device 420 controls the time period in which light is applied to the solid-state image sensor 22 (exposure time period) and the light shielding time period. The drive circuit 440 performs opening and closing driving, and drives the exposure operation and the signal read operation in the solid-state image sensor 22.

The signal processing circuit 430 performs predetermined signal processing, e.g., various types of correction processing such as demosaic processing and white balance adjustment processing on the signal output from the solid-state image sensor 22.

The optical system 410 is desirably configured to be capable of taking an image in a plurality of orientations (e.g., all orientations) in 4-dimensional space, and includes at least one lens. In this example, however, a video signal D1 after the signal processing in the signal processing circuit 430 and a position sensing signal D2 output from the gyro circuit 470 are transmitted through the data transmission unit 450 to an external apparatus by wireless communication.

Figure 9:
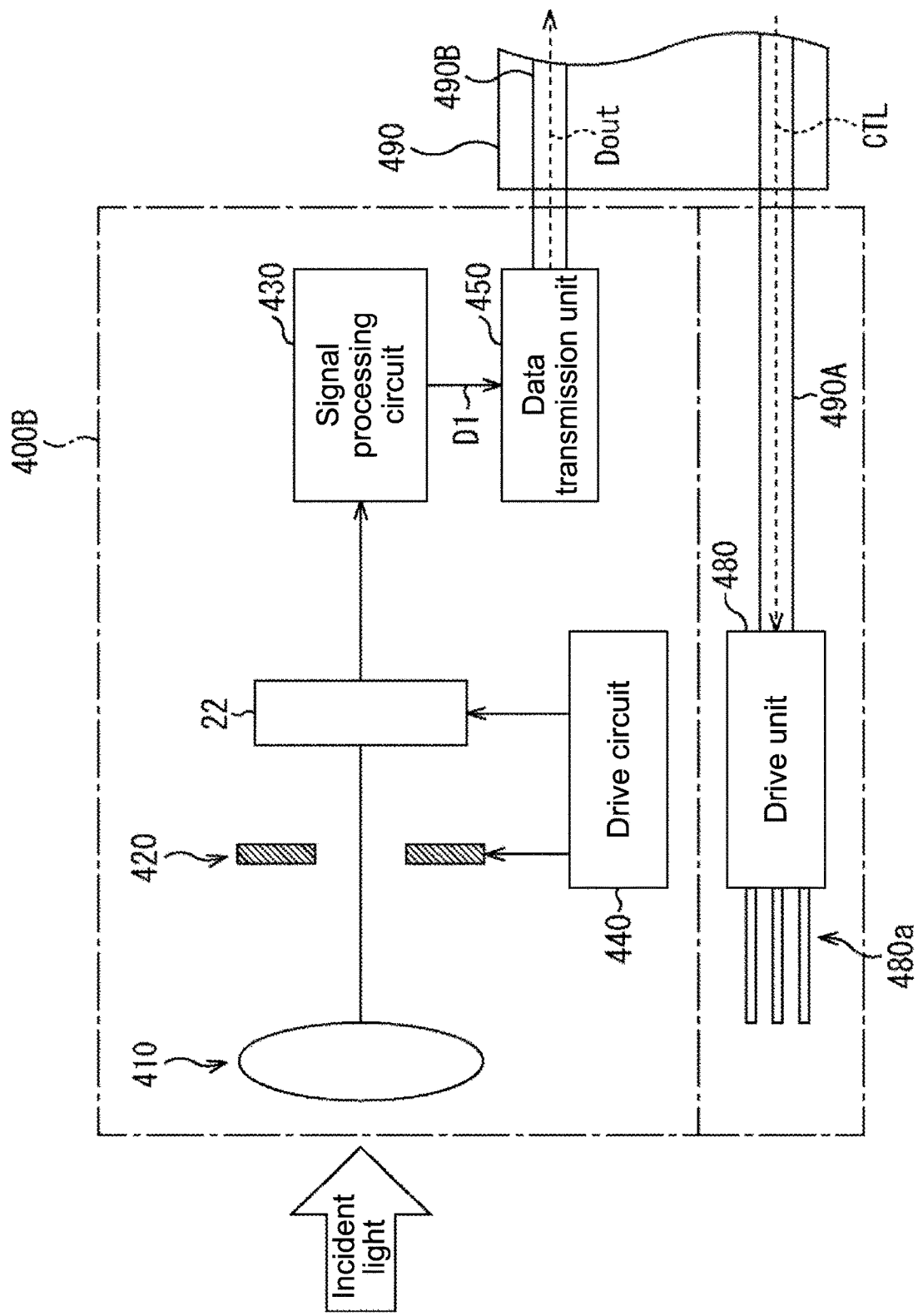
FIG. 9 A diagram showing application example to an endoscope.

Furthermore, the endoscope camera to which the image sensor according to the above-mentioned embodiment can be applied is not limited to the capsule-type camera described above, and may be an insert-type endoscope camera (insert type endoscope camera 400B) shown in FIG. 9, for example.

The insert type endoscope camera 400B includes the optical system 410, the shutter device 420, the solid-state image sensor 22, the drive circuit 440, the signal processing circuit 430, and the data transmission unit 450, similarly to a part of the configuration of the capsule-type endoscope camera 400A described above. Furthermore, to this insert type endoscope camera 400B, an arm 480a that can be housed in the apparatus and a drive unit 480 that drive the arm 480a are further attached. Such an insert type endoscope camera 400B is coupled to a cable 490 including a wiring 490A for transmitting an arm control signal CTL and a wiring 490B for transmitting a video signal Dout based on an image.

Figure 10:
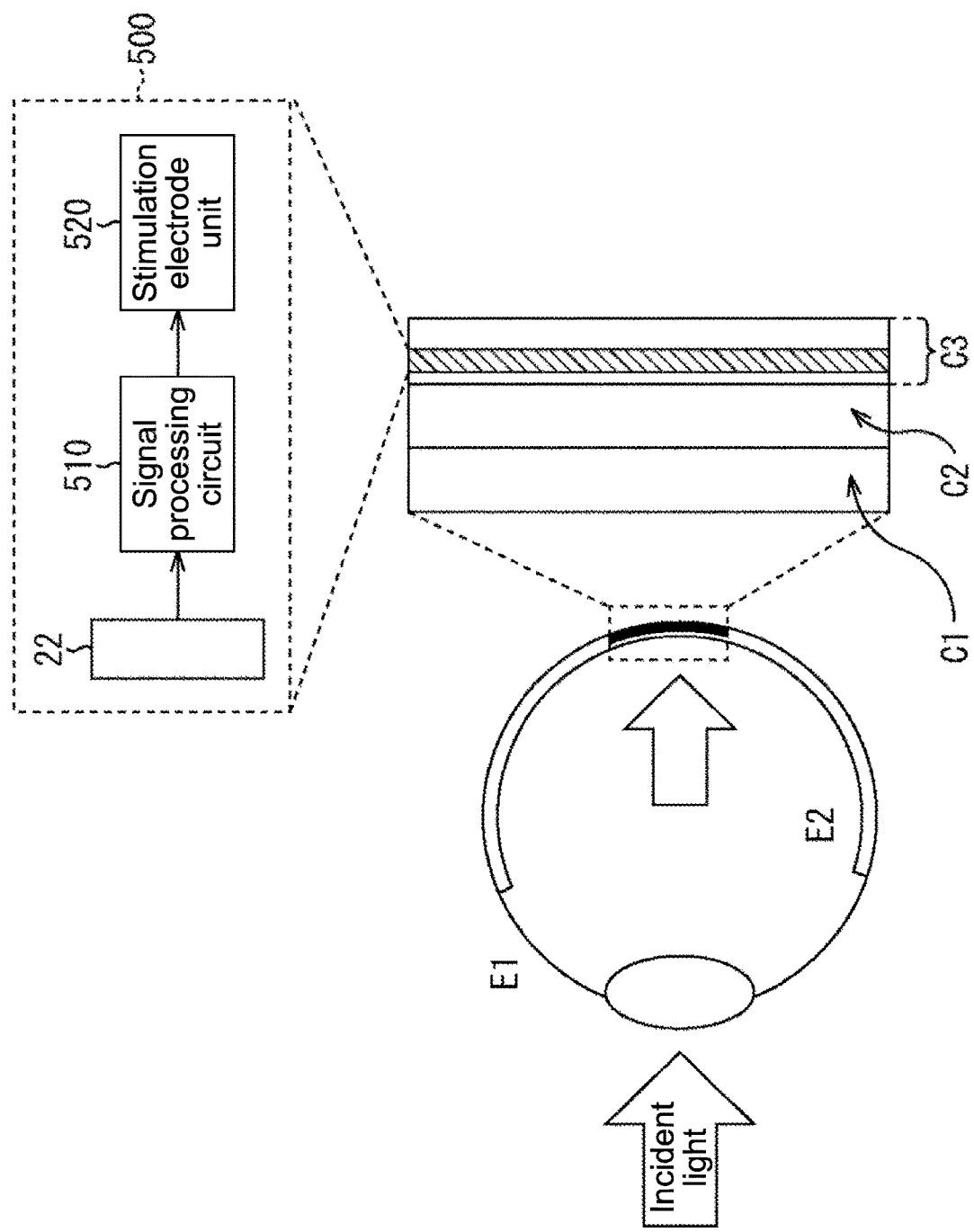
FIG. 10 A diagram showing an application example to a vision chip.

FIG. 10 is a functional block diagram showing the general configuration of a vision chip (vision chip 500) according to another application example. The vision chip 500 is an artificial retina embedded at a part of a wall (retina E2 having visual nerves) on a back side of an eye ball E1 of an eye. This vision chip 500 is embedded in a part of any of a ganglion cell C1, a horizontal cell C2, and a visual cell C3 in the retina E2, and includes the solid-state image sensor 22, a signal processing circuit 510, and a stimulation electrode unit 520, for example.

Accordingly, an electric signal based on incident light on an eye is obtained in the solid-state image sensor 22, the electric signal is processed by the signal processing circuit 510, and thus, a predetermined control signal is supplied to the stimulation electrode unit 520. The stimulation electrode unit 520 has a function to stimulate (provides an electric signal to) the visual nerves in response to the input control signal.

The present technology can be applied to such an apparatus.

In the specification, the system represents the entire apparatus including a plurality of apparatuses.

Furthermore, effects described in the specification are given for illustrative purposes only and not necessarily limited, and may be any other effects.

Furthermore, the present technology is not limited to the above-mentioned embodiments and various modifications can be made without departing from the gist of the present technology.

Furthermore, the present technology may also take the following configurations.

(1) An image sensor, including:
 a plurality of signal lines for reading signals from pixels including a photoelectric conversion element, each of the plurality of signal lines being provided for one column of pixels; and
 a fixing unit configured to fix potential of the plurality of signal lines to a predetermined potential, in which the fixing unit fixes the potential of the plurality of signal lines before reading of signals through a predetermined signal line out of the plurality of signal lines is started.

(2) The image sensor according to (1) above, in which
 the fixing unit fixes the potential of the plurality of signal lines before an operation of resetting the pixel.

(3) The image sensor according to (1) or (2) above, in which
 the fixing unit includes a potential fixing element and a switch, in which
 the switch is provided for each of the plurality of signal lines, and
 the potential fixing element and the plurality of signal lines are coupled to each other when the switch is active, thereby fixing the potential of the plurality of signal lines to a predetermined potential.

(4) The image sensor according to (1) or (2) above, in which
 the fixing unit includes a potential fixing element and a switch,
 the switch is provided for each of the plurality of signal lines, and
 the switch is active between end of reading of a first pixel and start of reading of a second pixel.

(5) The image sensor according to (1) or (2) above, in which
 the fixing unit includes a potential fixing element, in which
 the potential fixing element is coupled to each of the plurality of signal lines, and
 the potential fixing element is in on-state between end of reading of a first pixel and start of reading of a second pixel.

(6) An imaging method for an image sensor that includes a plurality of signal lines for reading signals from pixels including a photoelectric conversion element, each of the plurality of signal lines being provided for one column of pixels, and a fixing unit configured to fix potential of the plurality of signal lines to a predetermined potential, including
 fixing, by the fixing unit, the potential of the plurality of signal lines before reading of signals through a predetermined signal line out of the plurality of signal lines is started.

(7) An electronic apparatus, including:
 an image sensor including a plurality of signal lines for reading signals from pixels including a photoelectric conversion element, each of the plurality of signal lines being provided for one column of pixels, and a fixing unit configured to fix potential of the plurality of signal lines to a predetermined potential, in which the fixing unit fixes the potential of the plurality of signal lines before reading of signals through a predetermined signal line out of the plurality of signal lines is started; and a signal processing unit configured to perform signal processing on a signal output from the image sensor.

DESCRIPTION OF SYMBOLS 117 vertical signal line
201 photodiode
202 transfer transistor
203 reset transistor
204 amplification transistor
205 selection transistor
301 potential fixing element
302,303 switch

The invention claimed is:

1. An imaging device, comprising:
a first pixel including a first photodiode;
a second pixel including a second photodiode;
a first signal line coupled to the first pixel;
a second signal line coupled to the second pixel;
a first transistor coupled to the first signal line and the second signal line through a first node;
a switch circuit coupled to the first signal line and the second signal line; and
an analog to digital converter selectively coupled to the first signal line or the second signal line through the switch circuit,
wherein a source or a drain of the first transistor is coupled to a predetermined potential and the other terminal of the first transistor is coupled to the first node.

2. The imaging device of claim 1, wherein the switch circuit includes a second transistor between the first signal line and the analog to digital converter and includes a third transistor between the second signal line and the analog to digital converter.

3. The imaging device of claim 2, further comprising:
a fourth transistor coupled to the first signal line, a fifth transistor coupled to the second signal line, and a current source transistor coupled to the fourth transistor and the fifth transistor.

4. The imaging device of claim 3, further comprising:
a first selection wiring, wherein the first selection wiring is connected to a gate of the second transistor, and wherein the first selection wiring is connected to a gate of the fourth transistor; and
a second selection wiring, wherein the second selection wiring is connected to a gate of the third transistor, and wherein the second selection wiring is connected to a gate of the fifth transistor.

5. The imaging device of claim 3, wherein the first and second pixels are included in a first column of pixels.

6. The imaging device of claim 1, further comprising:
a first switch transistor coupled to the first node and the first signal line;
a second switch transistor coupled to the first node and the second signal line.

7. The imaging device of claim 6, further comprising:
a switch wiring coupled to a gate of the first switch transistor and the second switch transistor.

8. The imaging device of claim 1, wherein the first and second photodiodes are coupled to a first floating diffusion.

9. The imaging device of claim 8, further comprising a third photodiode and a fourth photodiode that are coupled to a second floating diffusion.

10. The imaging device of claim 9, further comprising:
a first transfer transistor, wherein the first photodiode is coupled to the first floating diffusion by the first transfer transistor;
a second transfer transistor, wherein the second photodiode is coupled to the first floating diffusion by the second transfer transistor;
a third transfer transistor, wherein the third photodiode is coupled to the second floating diffusion by the third transfer transistor; and
a fourth transfer transistor, wherein the fourth photodiode is coupled to the second floating diffusion by the fourth transfer transistor.

11. An electronic apparatus, comprising:
an imaging device including:
a first pixel including a first photodiode;
a second pixel including a second photodiode;
a first signal line coupled to the first pixel;
a second signal line coupled to the second pixel;
a first transistor coupled to the first signal line and the second signal line through a first node;
a switch circuit coupled to the first signal line and the second signal line; and
an analog to digital converter selectively coupled to the first signal line or the second signal line through the switch circuit,
wherein a source or a drain of the first transistor is coupled to a predetermined potential and the other terminal of the first transistor is coupled to the first node.

* * * * *